(12) United States Patent
May (10) Patent No.: US 7,031,670 B2
(45) Date of Patent: Apr. 18, 2006

(54) COMMUNICATIONS ACCESSORY AND COMPUTING UNIT THAT OPERATES THEREWITH

(75) Inventor: Gregory J May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 830 days.

(21) Appl. No.: 09/892,213

(22) Filed: Jun. 25, 2001

(65) Prior Publication Data

US 2002/0197962 A1    Dec. 26, 2002

(51) Int. Cl.
*H04B 1/02* (2006.01)

(52) U.S. Cl. .................. 455/90.3; 343/718; 455/575.1; 455/575.7

(58) Field of Classification Search ................ 361/636, 361/640, 681, 683, 686; 455/66.1, 90.3, 455/575.1, 575.7; 343/700 R, 718, 720
See application file for complete search history.

(56) References Cited

U.S. PATENT DOCUMENTS

| | | | | |
|---|---|---|---|---|
| 5,640,301 A | * | 6/1997 | Roecker et al. | ............. 361/686 |
| 5,678,229 A | * | 10/1997 | Seki et al. | .................... 455/572 |
| 5,689,821 A | * | 11/1997 | Shimazaki | ................... 708/109 |
| 5,801,919 A | | 9/1998 | Griencewic | ................ 361/683 |
| 5,828,341 A | * | 10/1998 | Delamater | .................. 343/702 |
| 6,104,606 A | | 8/2000 | Vossler | ........................ 361/686 |
| 6,116,962 A | * | 9/2000 | Laity | .......................... 439/676 |
| 6,118,653 A | * | 9/2000 | Kim | ............................ 361/683 |
| 6,161,944 A | | 12/2000 | Leman | ........................ 362/276 |
| 6,163,326 A | * | 12/2000 | Klein et al. | ................. 345/156 |
| 6,181,284 B1 | * | 1/2001 | Madsen et al. | ............. 343/702 |
| 6,266,017 B1 | * | 7/2001 | Aldous | ........................ 343/702 |
| 6,490,155 B1 | * | 12/2002 | Han et al. | .................... 361/686 |
| 6,509,876 B1 | * | 1/2003 | Jones et al. | ................. 343/702 |
| 6,518,927 B1 | * | 2/2003 | Schremmer et al. | ........ 343/702 |
| 6,577,500 B1 | * | 6/2003 | Paredes et al. | ............. 361/686 |
| 6,717,801 B1 | * | 4/2004 | Castell et al. | ............... 361/683 |

FOREIGN PATENT DOCUMENTS

| | | |
|---|---|---|
| EP | 0791878 A2 | 8/1997 |
| EP | 0984351 A2 | 3/2000 |
| EP | 1075038 A2 | 2/2001 |

OTHER PUBLICATIONS http://www.peak-development.co.uk/Bluetooth/bluetooth.htm; BlueTooth; dated: Feb. 12, 2001; pp. 1-3.

\* cited by examiner

*Primary Examiner*—Bing Q. Bui
(74) *Attorney, Agent, or Firm*—Jeff D. Limon (57) ABSTRACT

An accessory for transmitting signals, includes a receptacle that accepts signals of a first format from a computing unit. The accessory also includes a converter, coupled to the receptacle, which converts the signals of a first format to signals of a second format. The accessory also includes an aperture, coupled to the converter, which transmits the signals of the second format. The aperture is also coupled to a resilient element that extends the accessory from a compressed state, wherein the extension influences transmission of the signals of a second format. The accessory may also receive signals as well.

41 Claims, 10 Drawing Sheets

COMMUNICATIONS ACCESSORY AND COMPUTING UNIT THAT OPERATES THEREWITH

BACKGROUND OF THE INVENTION

The invention relates generally to computing units and, more particularly, to communications devices that operate with computing units.

Computing units, such as desktop, laptop, and handheld computers, typically communicate with peer computing and peripheral devices by way of a wireline communication interface. Typical protocols that bring about communication between peer and peripheral computing units include the Universal Serial Bus (USB), the Peripheral Component Interconnect (PCI) protocols, and many others. However, with the advent of wireless computer communications, such as wireless local area networks, Bluetooth, and IEEE 802.11 protocols, computing units can move away from wireline communications media and communicate wirelessly.

Wireless computer communications can be realized by using a wireless communications module that couples to a Personal Computer Memory Card International Association (PCMCIA) interface port available on many types of computing units. When a PCMCIA module is used, a radiating and receiving structure protrudes horizontally from the base of the computing unit and must be physically detached from the computing unit prior to storing the device in a carrying case. If the module is allowed to protrude from the PCMCIA slot as the computing unit is placed into a computer case, damage to the communications module and the surrounding structure can result. Additionally, when the computing unit is brought into an environment where the communications module should not inadvertently radiate energy, such as aboard an airplane, the communications module must be physically detached from the computing unit.

Ad hoc wireless computer communications can be brought about by using a transceiver that dangles from an end of a USB-compliant or a PCI-compliant cable. However, although this can enable a computing unit to quickly become capable of wireless communications, neither this nor the previously discussed PCMCIA device provide a communications device that appears physically integrated into the structure of the computing unit. Further, both devices are required to be disconnected from the computing unit to ensure that the device does not inadvertently radiate.

Therefore, it is highly desirable for a communications accessory to appear physically integrated into the structure of the computing unit, while providing control over the activation and deactivation of the device.

DESCRIPTION OF THE PREFERRED EMBODIMENTS

Figure 1:
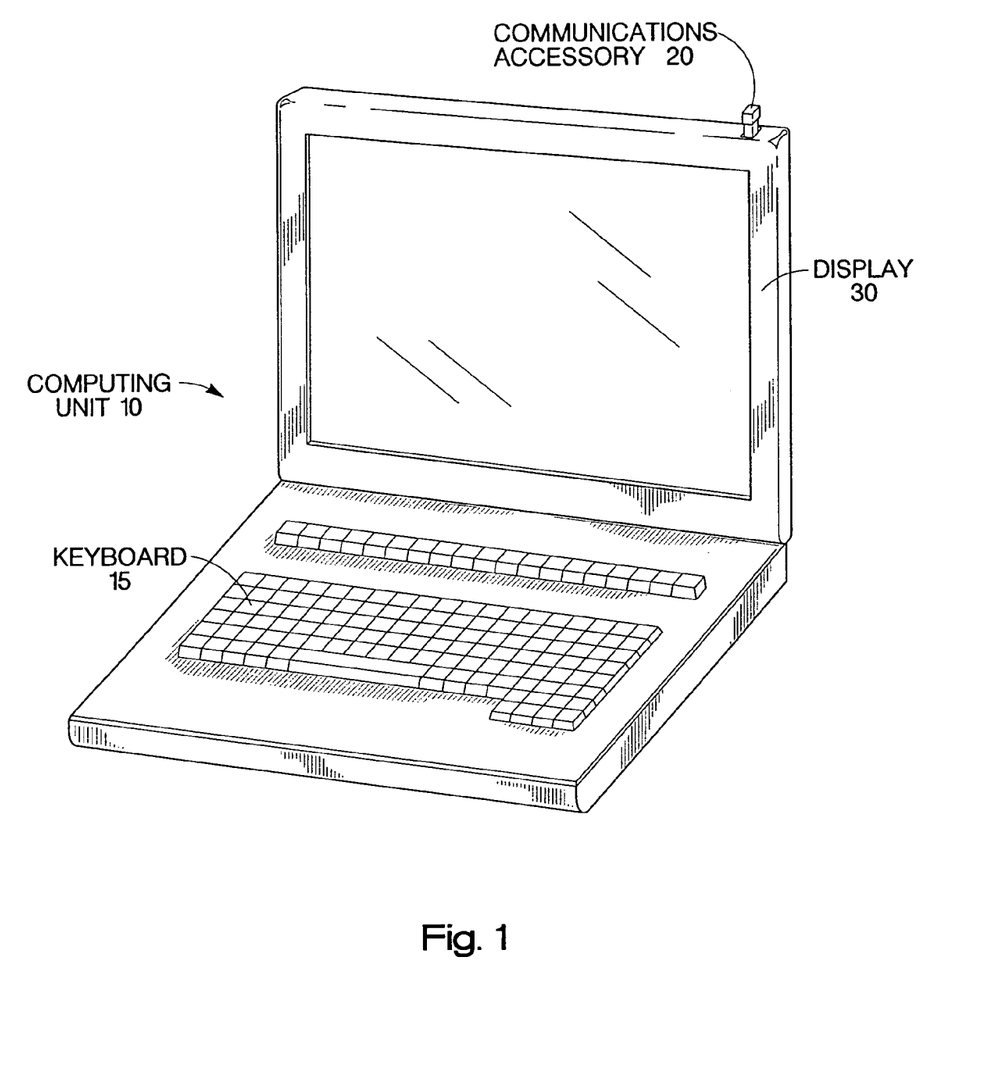
FIG. 1 is an illustration of a computing unit that includes a communications accessory in accordance with a preferred embodiment of the invention.

FIG. 1 is an illustration of a computing unit that includes a communications accessory in accordance with a preferred embodiment of the invention. In FIG. 1, computing unit 10 includes keyboard 15, display 30, and communications accessory 20. Computing unit 10 performs tasks that may include word processing, spread sheet analysis, electronic mail, and Internet browsing.

In FIG. 1, communications accessory 20 is positioned on the upper right surface of display 30 of computing unit 10. This location may be selected due to its elevation above a large portion of computing unit 10, thereby providing line-of-sight communications with other peer or peripheral computing units nearby computing unit 10. The accessory can also be placed at other locations of computing unit such as, near the upper center portion of display 30, or near the upper left corner of display 30, or any other location on computing unit 10 according to the preferences of the particular application.

In FIG. 1, communications accessory 20 provides the computing unit with a radio frequency wireless communications capability. Thus, communications accessory 20 enables computing unit 10 to communicate with other computing units by way of transmitting or receiving signals that accord with a wireless protocol, such as Bluetooth and IEEE 802.11B.

In another embodiment, communications accessory 20 provides an infrared communications link that enables computing unit 10 to communicate with other computing units by way of infrared signals. Further, communications accessory 20 can be a small display that employs an optical means to project images onto an external surface so that these images may be viewed by the human eye. Communications accessory 20 can also present images to the eye directly and without an intervening external surface.

Figure 2A:
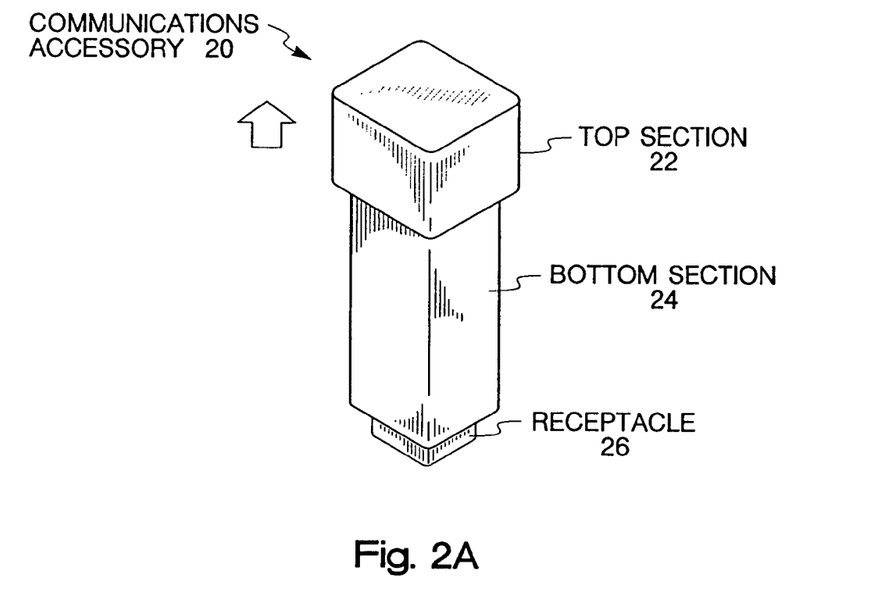
FIGS. 2A and 2B are views of the communications accessory of FIG. 1 in the compressed and extended positions in accordance with a preferred embodiment of the invention.
Figure 2B:
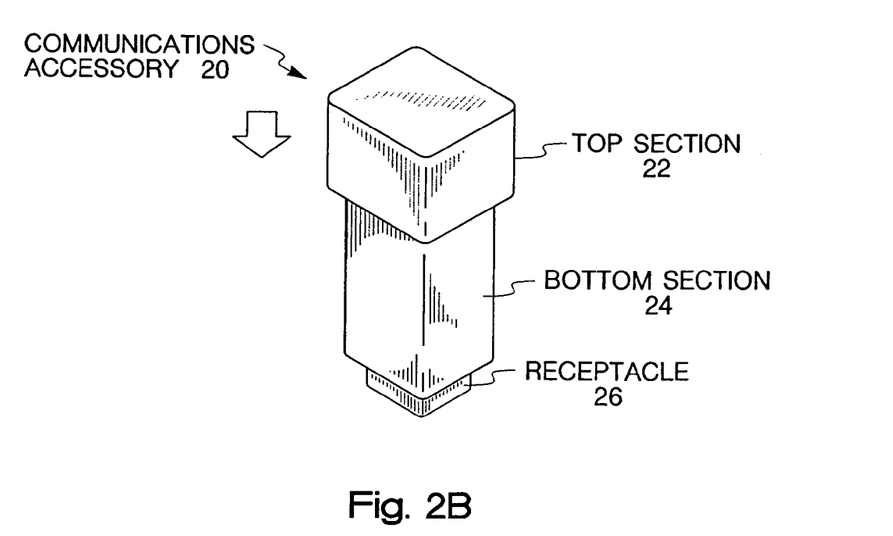

FIGS. 2A and 2B are views of the communications accessory of FIG. 1 in the compressed and extended positions in accordance with a preferred embodiment of the invention. Preferably, communications accessory 20 includes a top section 22, bottom section 24, and receptacle 26. In FIG. 2A, an inner surface of top portion 22 slides along an upper portion of bottom section 24 to a compressed position such as that shown in FIG. 2B.

Communications accessory 20 includes a resilient element, such as a spring (see FIG. 7) that biases top section 22 in an extended position. Communications accessory 20 preferably also includes a latch (see FIG. 7) that hinders the extension of the accessory from the compressed position until the accessory is actuated. Desirably the accessory is able to radiate or receive signals while in the extended position, as in FIG. 2A, and unable to radiate or receive while in the compressed position, as in FIG. 2B.

Figure 3:
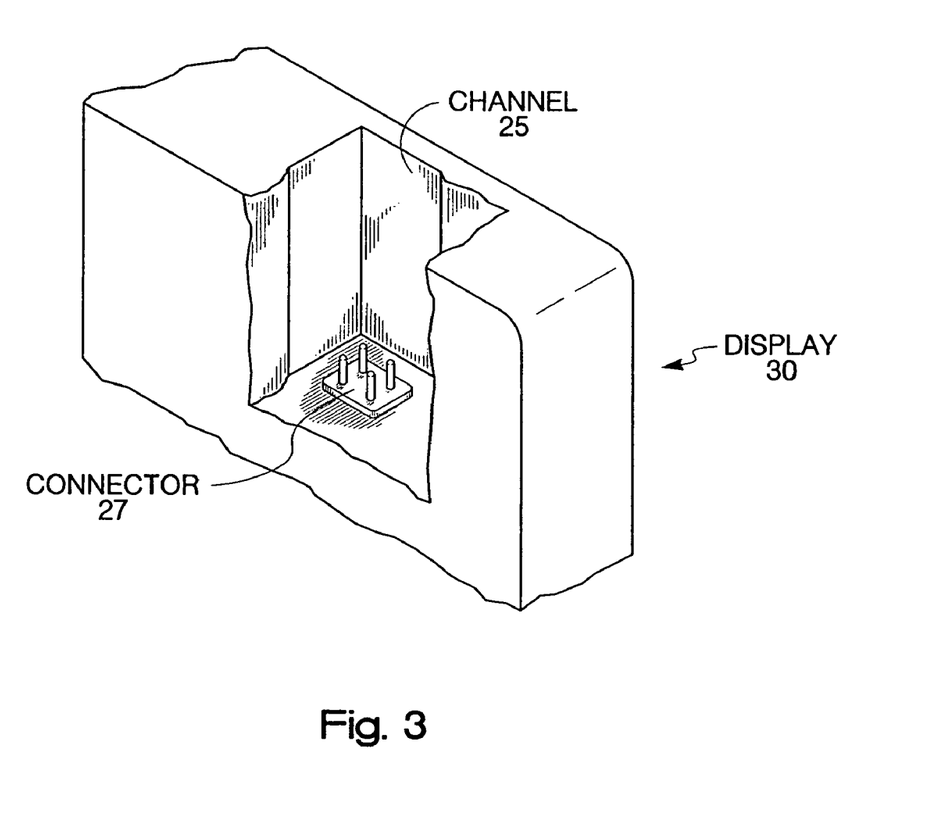
FIG. 3 is a cutaway view of the upper right portion of the display of FIG. 1 showing the channel that accepts the communications accessory, in accordance with a preferred embodiment of the invention.

FIG. 3 is a cutaway view of a portion of an upper right portion of display 30 of computing unit 10 showing channel 25 accepting the communications accessory in accordance with a preferred embodiment of the invention. Preferably, the base portion of channel 25 includes connector 27 that provides a mechanical and electrical interface to computing unit 10 by way of a standard such as USB, PCI, Secure Digital, or Memory Stick. Connector 27 preferably also provides direct current, alternating current, or another type of electrical power to the accessory.

Figure 4:
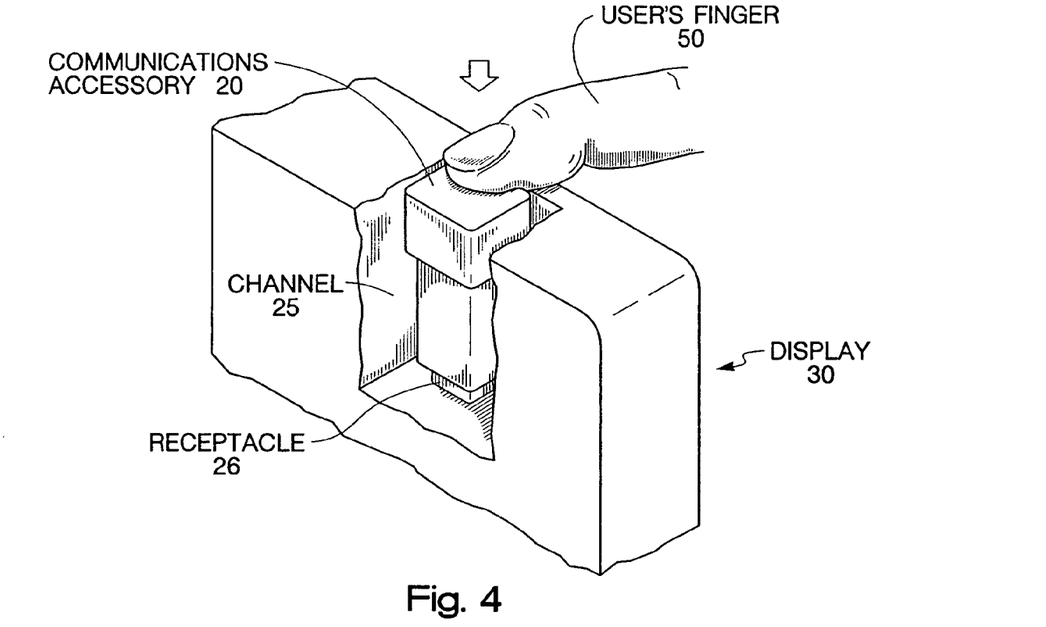
FIG. 4 is a cutaway view of the upper right portion of the display of FIG. 1 showing the communications accessory in accordance with a preferred embodiment of the invention.

FIG. 4 is a cutaway view of the upper right portion of display 30 showing communications accessory 20 in accordance with a preferred embodiment of the invention. In FIG. 4, a user's finger (50) is shown inserting communications accessory 20 into channel 25 of a portion of computing unit 10 and applying downward pressure to physically latch and store the accessory in the compressed position. Desirably, the compressible aspect of the communications accessory enables the accessory to be stored within the outer boundary of display 30. When communications accessory 20 is stored within display 30, the accessory is partially or fully deactivated. This partial or complete deactivation of the accessory can be facilitated by way of a mechanical switch inside the accessory, or by way of a mechanical switch within the display at an area beneath the accessory. Further, the partial or complete deactivation of communications accessory 20 can be brought about by way of a change in a logic state of a driver that controls the interaction between the accessory and the computing unit.

Figure 5:
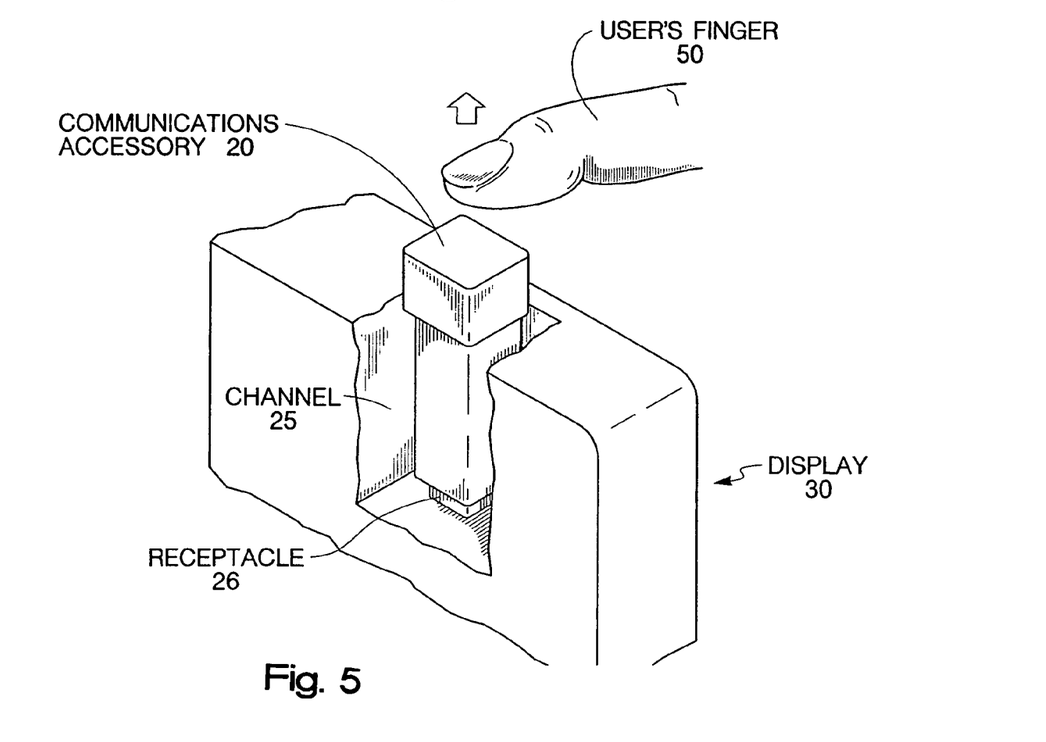
FIG. 5 is another detailed view of a portion of the display of FIG. 2 showing the communications accessory in accordance with a preferred embodiment of the invention.

FIG. 5 is another detailed view of a portion of the display of computing unit 10 showing communications accessory 20 in accordance with a preferred embodiment of the invention. In FIG. 5, a user's finger (50) is shown applying downward pressure to the accessory 20, thereby unlatching the accessory and allowing it to be extended from its compressed position. Preferably, when communications accessory 20 is extended to protrude beyond the boundary of the computing unit, the accessory is activated. This activation permits wireless communications with other computing units by way of communications accessory 20.

Figure 6A:
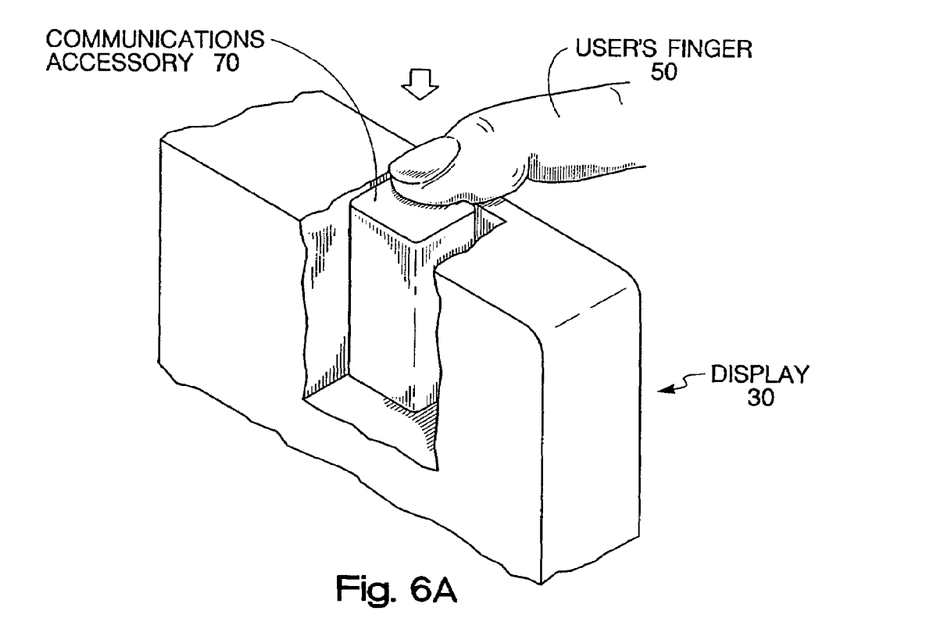
FIGS. 6A and 6B are cutaway views of a portion of the computing unit of FIG. 1, in accordance with an alternate embodiment of the invention.
Figure 6B:
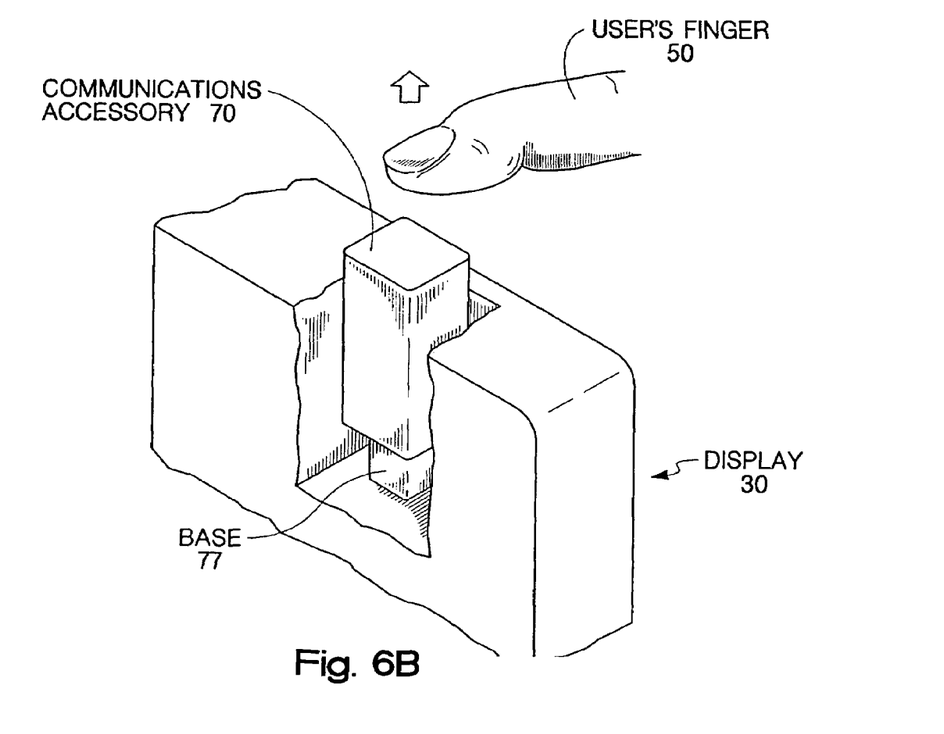

FIGS. 6A and 6B are cutaway views of a portion of the computing unit showing an alternate embodiment of the communications accessory. In FIGS. 6A and 6B, an outer surface of communications accessory 70 is fabricated using a single section, with a lower portion of the single section sliding along an outward surface of base 77. Base 77 remains affixed to a portion of computing unit 10 and incorporates a resilient mechanism that enables the activation and deactivation of the accessory as a result of the compression and extension of the accessory. FIG. 6A shows the accessory in the compressed position corresponding to the partial or complete deactivation of the accessory. FIG. 6B shows the accessory in the extended position corresponding to the activation of the accessory.

Figure 7:
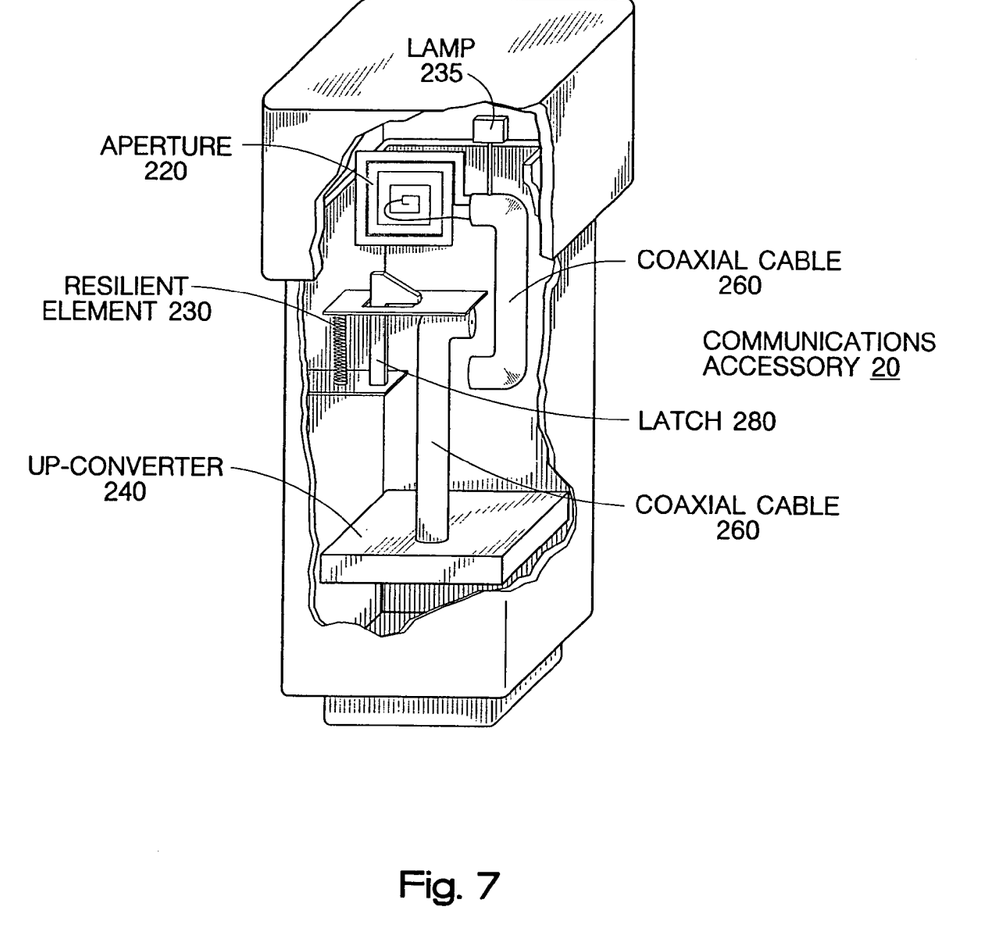
FIG. 7 is a cutaway view of the communications accessory of FIG. 2 in accordance with a preferred embodiment of the invention.

FIG. 7 is a cutaway view of communications accessory 20 in accordance with a preferred embodiment of the invention. In FIG. 7, aperture 220 is a spiral antenna coupled to coaxial cable 260. Resilient element 230 provides tension that separates the sections of coaxial cable 260 when latch 280 retains the accessory in the compressed position. When communications accessory 20 is extended, the sections of coaxial cable 260 are brought together, thereby coupling aperture 220 to up-converter 240. Up-converter 240 converts signals of a first format to a second format so that signals of the second format can be radiated by aperture 220.

Preferably, the accessory is maintained in the extended position by way of resilient element 230. When the accessory is extended, a voltage is supplied by coaxial cable 260 to illuminate lamp 235, thus indicating that the accessory has been activated. Lamp 235 can be a light-emitting diode or other electronic device that emits light or other radiation when a voltage is applied.

Aperture 220 can also be an omnidirectional antenna having a balun and a coaxially coupled feed structure. Alternatively, aperture 220 can represent a directional antenna that provides increased gain in certain directions and decreased gain in other directions. Regardless of the type of antenna represented by aperture 220, resilient element 230 influences the coupling of the antenna to up-converter 240, thus permitting aperture 220 to radiate or receive signals.

In accordance with an alternate embodiment of the invention, aperture 220 can be replaced by an aperture that receives and transmits infrared energy, thus providing an infrared communications capability. Aperture 220 can also be a camera lens or other optical device that receives images. Further, aperture 220 can be a miniature projector that projects images onto an external surface or makes images available to the human eye directly.

Resilient element 230 can be a spring or other elastic material. The selected resilient or elastic element can be placed between an upper section of coaxial cable 260 and aperture 220, or placed between a lower section of the coaxial cable and up-converter 240. Preferably, resilient element 230 is placed between any two or more elements to provide a mechanism for partially or completely deactivating the accessory in response to the compression or extension of the accessory. As mentioned in reference to FIG. 4, the partial or complete deactivation of the accessory can be accomplished by positioning a resilient element beneath the accessory, such as within display 30. This deactivation can also be brought about by a software-implemented change in the logical state of a driver program that runs on a processor of computing unit 10 to control the operations of the accessory.

Figure 8:
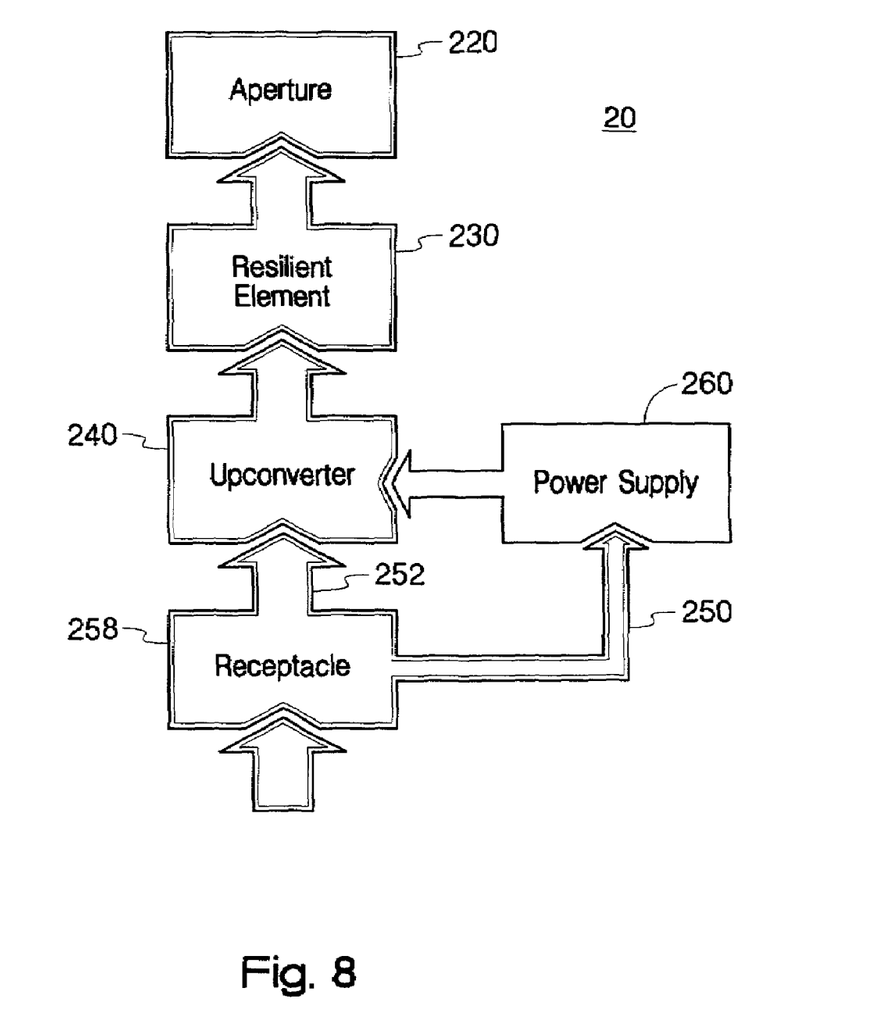
FIG. 8 is a block diagram of components within the communications accessory of FIG. 7 in accordance with a preferred embodiment of the invention.

FIG. 8 is a block diagram of components within the communications accessory of FIG. 7 in accordance with a preferred embodiment of the invention. In FIG. 8, receptacle 258 provides a mechanical interface to a portion of computing unit 10, thereby enabling power supply 260 to receive power input 250. Receptacle 258 also conveys baseband signals from the computing unit to up-converter 240 by way of up-converter input 252. Up-converter input 252 represents signals encoded in a first format, such as baseband digital, video, phase modulated, or other type of signal from computing unit 10 of FIG. 1. These signals are converted to a second format that accords with a protocol such as Bluetooth, or IEEE 802.11B. After the conversion, the signals are transmitted to an external computing unit through aperture 220. The coupling of signals from up-converter 240 to aperture 220 is controlled or influenced by resilient element 230.

Figure 9:
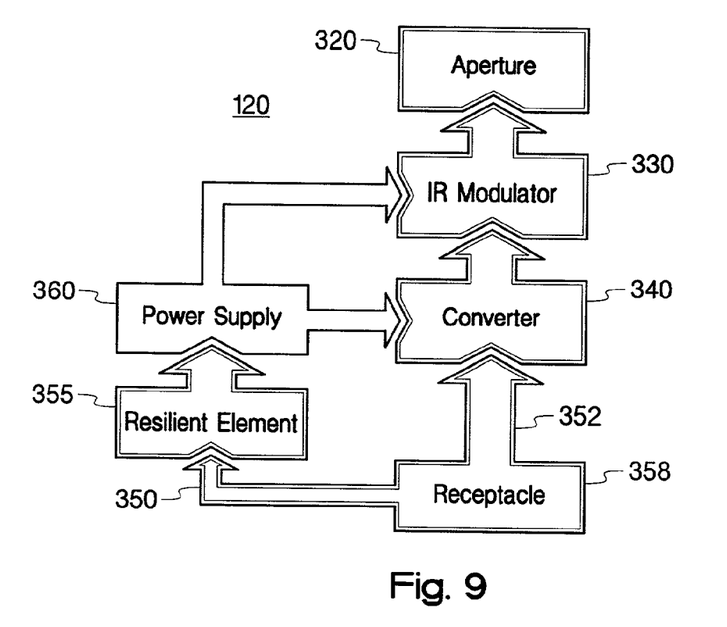
FIG. 9 is a block diagram of elements of a communications accessory in accordance with an alternate embodiment of the invention.

FIG. 9 is a block diagram of elements of a communications accessory in accordance with an alternate embodiment of the invention. The operation of communications accessory 120 has some similarity with the operations of communications accessory 20, an exception being that accessory 120 transmits signal through a wireless infrared link as opposed to the wireless radio frequency link of communications accessory 20. Communications accessory 120 can be similar in appearance to communications accessory 20.

In FIG. 9, aperture 320 includes a window through which infrared signals are transmitted. Infrared modulator 330 is coupled to aperture 320. Desirably, infrared modulator 330 generates and regulates the flow of infrared signals from converter 340 to aperture 320 in accordance with an infrared communications protocol.

Communications accessory 120 receives input 352 by way of receptacle 358, which carries baseband information from a computing unit. The baseband information can be binary digital information, video pluses, or any other type of signal that conveys information to the accessory. Communications accessory 120 also includes power supply 360, which provides primary power to infrared modulator 330 and converter 340. Resilient element 355 influences the coupling of primary power to power supply 360 as a result of the accessory being in a compressed or an extended position. When communications accessory 120 is in the compressed position, resilient element 355 decouples input 350 from power supply 360, thereby removing primary power to the accessory. When communications accessory 120 is in the extended position, resilient element 355 couples power supply 360 to input 350 from receptacle 358.

Figure 10:
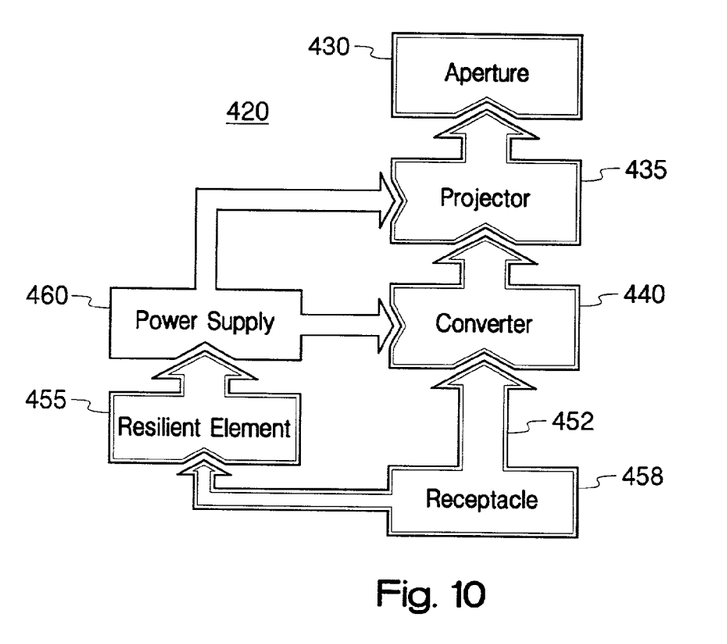
FIG. 10 is a block diagram of components of a communications accessory in accordance with an alternate embodiment of the invention.

FIG. 10 is a block diagram of components of a communications accessory in accordance with an alternate embodiment of the invention. In FIG. 10, communications accessory 420 operates in a manner somewhat similar to communications accessory 20, an exception being that accessory 420 projects optical information onto an external surface, as opposed to the radio frequency wireless link of communications accessory 20. Accessory 420 can be similar in appearance to communications accessory 20 of FIG. 2.

Communications accessory 420 receives input 452 by way of receptacle 458. Preferably, input 452 includes baseband information from a computing unit. This information can be in the form of binary digital data, video pulses, or any alternative form that conveys information to communications accessory 420. Power supply 460 provides primary power to projector 435 and to converter 440. Resilient element 455 influences coupling of the primary power to power supply 460 as a result of the accessory being placed in a compressed or an extended position. When the accessory is in the compressed position, resilient element 455 decouples power supply 460 from the computing unit. When communications accessory 420 is in the extended position, resilient element 455 brings power supply 460 into contact with receptacle 458 that carries power from the computing unit.

In the embodiments of FIGS. 1–10, the communications accessories (20, 120, and 420) have been described as being transmitters in order to simplify the description. However, the up-converters and infrared modulators of FIGS. 5, 6, and 7 can be replaced by two-way transceivers that both receive and transmit information. This can be realized by way of a separate transmit and receive path between apertures 220, 320, and 430, and receptacles 258, 358, and 458, respectively. Or, these functions can be performed using converters and modulators that function as transceivers that facilitate two-way transmission and reception of signals.

Figure 11:
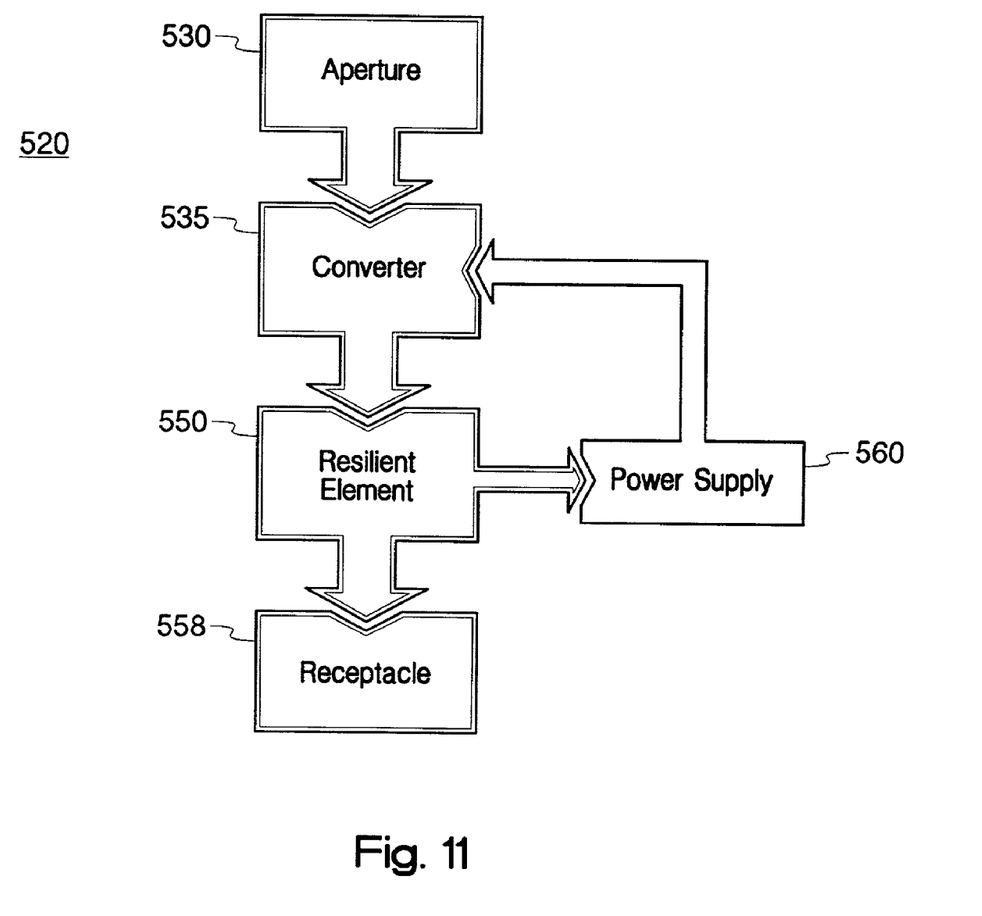
FIG. 11 is a block diagram of components of a communications accessory that includes a camera in accordance with an alternate embodiment of the invention.

FIG. 11 is a block diagram of components of a communications accessory that includes a camera in accordance with an alternate embodiment of the invention. In FIG. 11, communications accessory 520 operates in a manner that is at least somewhat reciprocal to communications accessory 420 of FIG. 10. In FIG. 11, communications accessory 520 receives optical information as opposed to transmitting optical information as performed by communications accessory 420. Communications accessory 520 may be similar in appearance to communications accessory 20 of FIG. 2.

Communications accessory 520 receives optical images through aperture 530. The images are converted, by way of converter 535, from an optical format to an electronic format. Preferably, the electronic format is in accordance with a protocol such as USB, PCI, Secure Digital, or Memory Stick. These signals output through receptacle 558 to a computing unit. Receptacle 558 desirably also conveys power from the computing unit.

Converter 535 can be any type of image capturing device such as a digital camera. Desirably, converter 535 focuses incoming light through a lens that permits the light to strike a sensor array. In this embodiment, the converter converts the incoming light to an electronic format.

Resilient element 550 influences the coupling of primary power to power supply 560 as a result of the accessory being placed in a compressed or an extended position. When communications accessory 520 is in the compressed position, resilient element 550 decouples power supply 560 from the computing unit. When communications accessory 520 is in the extended position, resilient element 550 brings power supply 560 into contact with power connections from the computing unit.

In alternative embodiments, resilient element 550 is placed between other elements of communications accessory 520. For example, resilient element 550 can influence the coupling and decoupling of power supply 560 while the connection of converter 535 to receptacle 558 is not significantly affected by the compression and extension of the accessory. In another embodiment, resilient element 550 directly influences the coupling of signals from aperture 530 as a result of the compression or extension of communications accessory 520.

Figure 12:
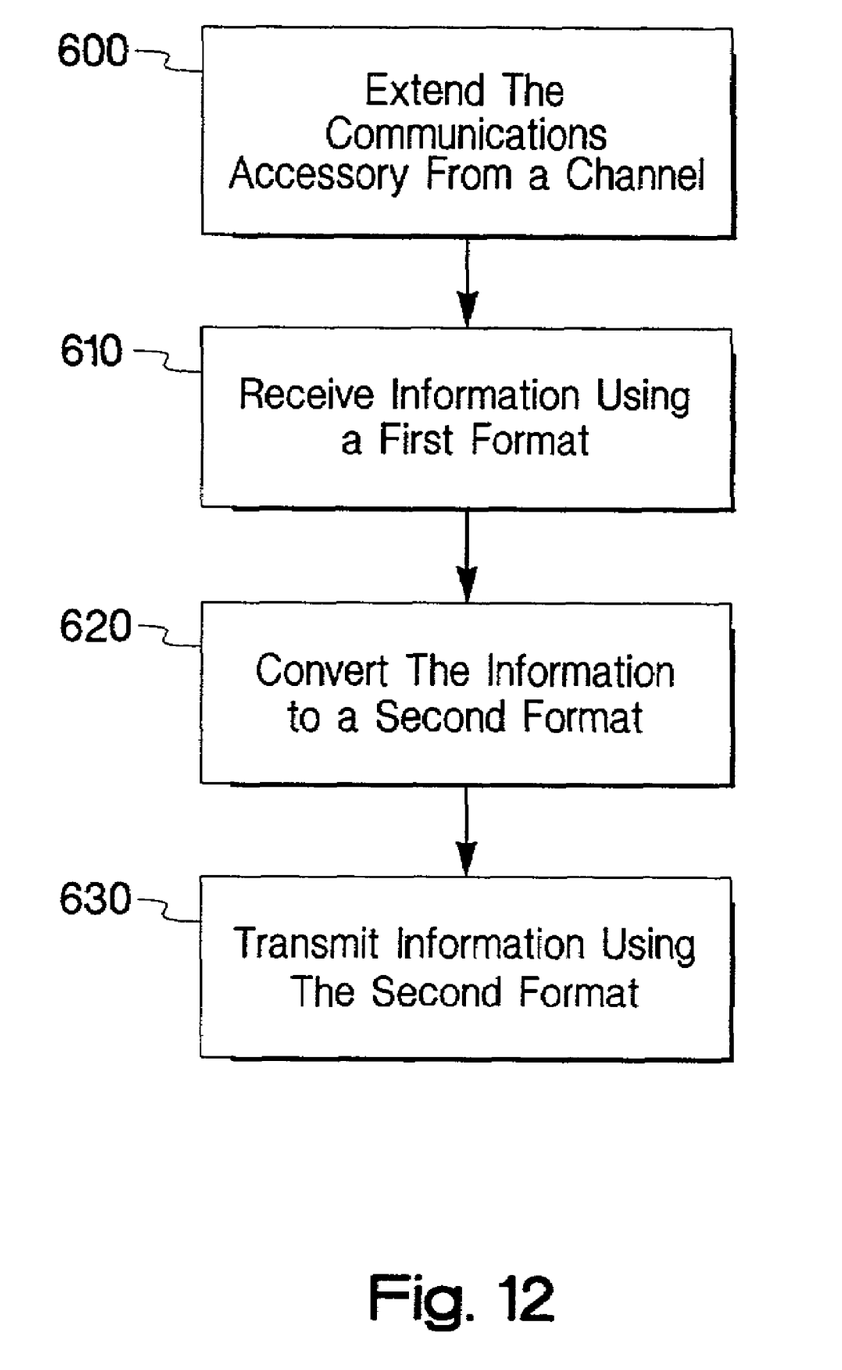
FIG. 12 is a flowchart for a method of transmitting information received from a computing unit in accordance with a preferred embodiment of the invention.

FIG. 12 is a flowchart for a method of transmitting information received from a computing unit in accordance with a preferred embodiment of the invention. The method begins at block 600 where the accessory is extended from a channel formed in the case of a computing unit. Block 600 can further include extending a spring or other resilient element that permits the accessory to accept data from the computing unit coupled to the communications accessory. Alternatively, block 600 can include the computing unit activating a logical address corresponding to the communications accessory, thereby enabling communications between the accessory and the computing unit Block 600 can optionally include latching the communications accessory in an extended position. This latching action can permit power to couple from the computing unit to the accessory.

The method continues at block 610 in which the communications accessory receives information in a first format, such as USB, PCI, Secure Digital, or Memory Stick. The method continues at block 620 in which the information is converted to a second format. This second format can correspond to a Bluetooth protocol, or an IEEE 802.11B protocol. The second format can also correspond to an optical or infrared protocol. The method continues at step 630, in which the communications accessory transmits information using the second format.

Block 630 may include transmitting a signal through an antenna. Alternatively, block 630 may include modulating and transmitting an infrared signal using second format, as described with reference to FIG. 9. Further, block 630 can include transmitting optical information which can be viewed on an external surface by a human eye, as described with reference to FIG. 10.

What is claimed is:

1. An accessory for transmitting signals, comprising:
   a receptacle that accepts signals of a first format from a computing unit;
   a converter, coupled to said receptacle, which converts said signals of a first format to signals of a second format; and
   an aperture, coupled to said converter, which transmits said signals of said second format, said aperture being further coupled to a resilient element that extends said accessory from a compressed state, said extension influencing transmission of said signals of a second format.

2. The accessory of claim 1 wherein said signals of a first format are in accordance with a universal serial bus protocol.

3. The accessory of claim 1 wherein said aperture is an antenna.

4. The accessory of claim 3 wherein said signals of a second format are in accordance with an IEEE 802.11B protocol.

5. The accessory of claim 3 wherein said signals of a second formatted are in accordance with a Bluetooth protocol.

6. The accessory of claim 3 wherein said antenna provides gain that is increased in some directions and decreased in other directions.

7. The accessory of claim 1 further comprising an infrared modulator coupled to said converter and said aperture.

8. The accessory of claim 1 further comprising a projector, coupled to said converter, that projects images through said aperture.

9. The accessory of claim 1 wherein said resilient element is a spring.

10. The accessory of claim 1 wherein said accessory further comprises a latch which holds said resilient element in a compressed position.

11. The accessory of claim 1 further comprising a lamp which illuminates when said accessory is in an extended position.

12. An accessory to a computing unit, comprising:
    a converter which converts signals of a first format to signals of a second format;
    an aperture coupled to said converter, which transmits said signals of said second format, and
    a spring, disposed between said aperture and said converter for controlling coupling of said signals of said first format to said converter.

13. The accessory of claim 12 wherein said signals of said first format are formatted in accordance with a universal serial bus protocol.

14. The accessory of claim 12 wherein said aperture is an antenna.

15. The accessory of claim 14 wherein said antenna transmits signals formatted in accordance with an IEEE 802.11B protocol.

16. The accessory of claim 14 wherein said second format is in accordance with a Bluetooth protocol.

17. The accessory of claim 14 wherein said antenna provides gain that is greater in some directions and lesser in other directions.

18. The accessory of claim 12 further comprising an infrared demodulator coupled between said aperture and said converter.

19. The accessory of claim 12, further comprising a latch which hinders movement of said spring.

20. In a communications accessory, a method for transmitting information from a computer coupled to said communications accessory, comprising:
    extending said communications accessory from a channel, said extension causing said communications accessory to become active;
    said communications accessory receiving information using a first format;
    said communications accessory converting said information to a second format; and
    said communications accessory transmitting said information using said second format.

21. The method of claim 20 wherein said first format is in accordance with a universal serial bus protocol.

22. The method of claim 20 wherein said second format is in accordance with a Bluetooth protocol.

23. The method of claim 20 wherein said second format is in accordance with an IEEE 802.11B protocol.

24. The method of claim 20 wherein said transmitting step is accomplished by way of an antenna operating at a radio frequency.

25. The method of claim 20 wherein said transmitting step is accomplished by way of a source that transmits an infrared signal.

26. The method of claim 20 wherein said transmitting step is accomplished by way of transmitting optical information.

27. The method of claim 26 wherein said optical radiation is displayed on an external surface.

28. The method of claim 20 wherein said extending action includes extending a spring from a compressed state.

29. The method of claim 20 wherein said extending action includes extending a resilient element from within said channel.

30. The method of claim 20 wherein said extending action is followed by unlatching said communications accessory, thereby actuating said communications accessory from a compressed to an extended position.

31. The method of claim 20 wherein said extending action permits power to couple to said communications accessory.

32. The method of claim 20 wherein said extending action permits said communications accessory to accept data from said computer coupled to said communications accessory.

33. The method of claim 32 wherein said extending action additionally permits said computer transmit information to said communications accessory.

34. The method of claim 20 additionally comprising illuminating a lamp within said communications accessory.

35. In a communications accessory, a method for transmitting information from a computer coupled to said communications accessory, comprising:
    extending said communications accessory from a channel, said extending action resulting in bringing a transmission line element to couple with an antenna;
    said communications accessory receiving information encoded in a first format;
    said communications accessory converting said information encoded in a first format to a second format; and
    said communications accessory transmitting said information using said second format.

36. The method of claim 35 wherein said first format is in accordance with a universal serial bus protocol.

37. The method of claim 35 wherein said transmitting step is performed using an antenna that operates at a radio frequency.

38. The method of claim 37 wherein said second format is in accordance with an 802.11B protocol.

39. The method of claim 37 wherein said second format is in accordance with a Bluetooth protocol.

40. The method of claim 37 wherein said antenna provides increased gain in certain directions and decreased gain in other directions.

41. An accessory that transmits signals, comprising:

means for receiving information in a first format;

means for converting said information from said first format to a second format;

means for transmitting information using said second format;

means for extending said accessory from a computing device, said means for extending said accessory influencing said means for transmitting.

\* \* \* \* \*